Oct. 12, 1954

H. J. LINGAL ET AL 2,691,709

CIRCUIT BREAKER

Filed Oct. 31, 1952

WITNESSES:
E. A. McCloskey
Paul D. Harber

INVENTORS
Harry J. Lingal and
Jerome Sandin.
BY Ralph H. Swingle
ATTORNEY

Oct. 12, 1954

H. J. LINGAL ET AL 2,691,709

CIRCUIT BREAKER

Filed Oct. 31, 1952

WITNESSES:

INVENTORS
Harry J. Lingal and
Jerome Sandin.
BY
ATTORNEY

Oct. 12, 1954                H. J. LINGAL ET AL                    2,691,709
                                CIRCUIT BREAKER
Filed Oct. 31, 1952                                           6 Sheets-Sheet 3

WITNESSES:                                              INVENTORS
                                                      Harry J. Lingal and
                                                        Jerome Sandin.
                                                    BY
                                                                ATTORNEY Oct. 12, 1954 H. J. LINGAL ET AL 2,691,709
CIRCUIT BREAKER
Filed Oct. 31, 1952 6 Sheets-Sheet 4
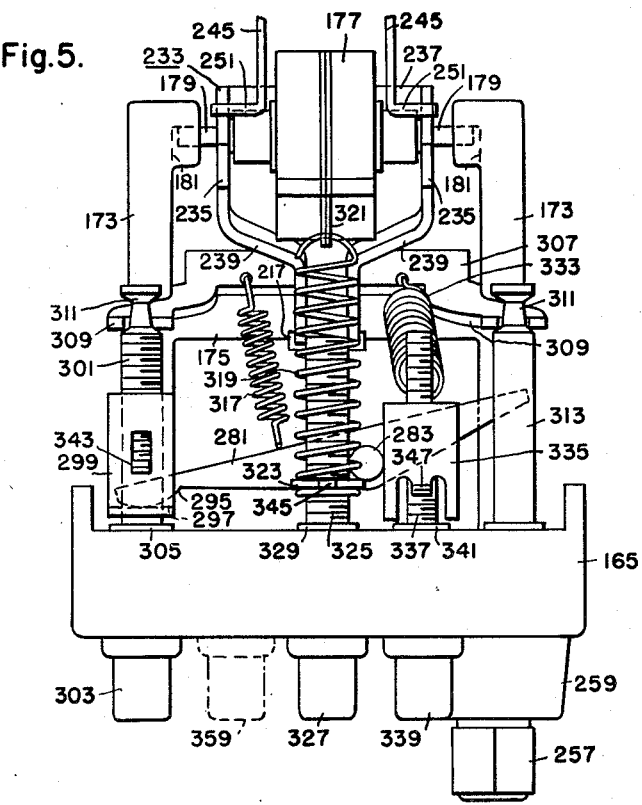
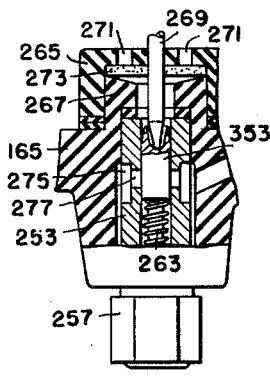
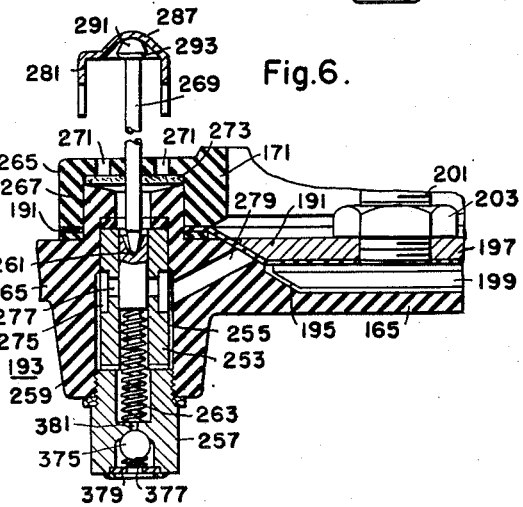
WITNESSES:
INVENTORS
Harry J. Lingal and
Jerome Sandin.
BY
ATTORNEY Oct. 12, 1954  H. J. LINGAL ET AL  2,691,709
CIRCUIT BREAKER
Filed Oct. 31, 1952  6 Sheets-Sheet 5
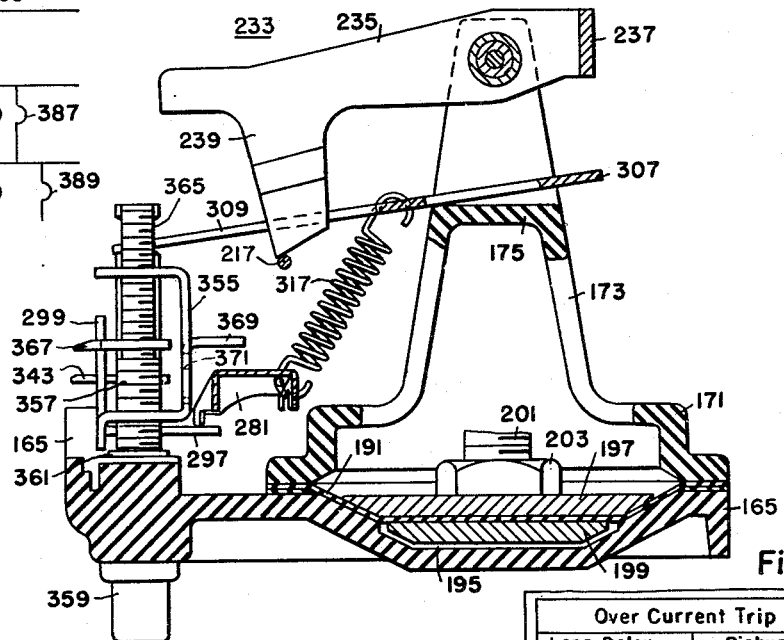
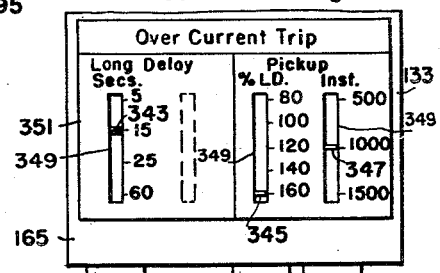
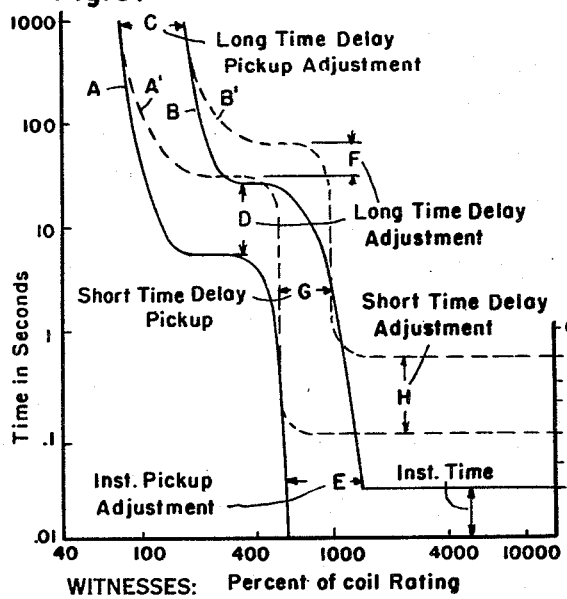
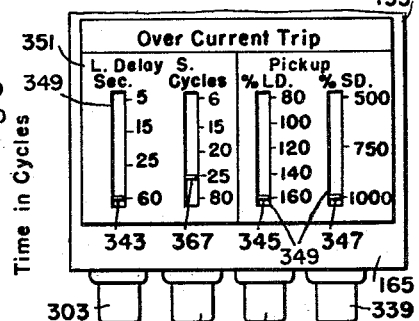
WITNESSES:
E. G. McCloskey.
Paul O. Harlein.
INVENTORS
Harry J. Lingal and
Jerome Sandin.
BY
Ralph H. Swingle
ATTORNEY Oct. 12, 1954  H. J. LINGAL ET AL  2,691,709
CIRCUIT BREAKER
Filed Oct. 31, 1952  5 Sheets-Sheet 6

WITNESSES:
E.A. McCloskey.
Paul O'Harlen

INVENTORS
Harry J. Lingal and
Jerome Sandin.
BY
Ralph H. Swingle
ATTORNEY

Patented Oct. 12, 1954

2,691,709

UNITED STATES PATENT OFFICE 2,691,709

CIRCUIT BREAKER

Harry J. Lingal and Jerome Sandin, Pittsburgh, Pa., assignors to Westinghouse Electric Corporation, East Pittsburgh, Pa., a corporation of Pennsylvania Application October 31, 1952, Serial No. 317,952

15 Claims. (Cl. 200—108)

This invention relates to circuit breakers and more particularly to circuit breakers of the type used to control light to moderate power distribution circuits.

An object of the invention is to provide a circuit breaker embodying a trip device which is selectively responsive at different time delays to overload currents of different value.

Another object of the invention is to provide a circuit breaker embodying a trip device including a time-delay device of the fluid dashpot type in which the time delay in the operation of the trip device is controlled by admitting fluid to the dashpot at different rates.

Another object of the invention is to provide a circuit breaker having an electroresponsive trip device embodying a time-delay device of the fluid dashpot type in which time delays of different duration are effected in the operation of the trip device by the operation of a single valve means to admit fluid to the dashpot at different rates.

A further object of the invention is to provide a circuit breaker embodying a trip device in which the operating parts are mounted on a base which is readily removable without disengaging any connection.

Another object of the invention is to provide a circuit breaker embodying a trip device in which the operating parts are mounted on a separate base which is removable without destroying the calibration of the device.

Another object of the invention is to provide a circuit breaker embodying a novel trip device comprising a plurality of separable insulating housing units including an energizing coil insulated from other parts of said trip device by parts of adjacent housing units.

Another object of the invention is to provide a circuit breaker embodying a trip device in which the operating parts are mounted on a removable base to facilitate assembly, calibration and adjustment.

The invention both as to structure and operation, together with additional objects and advantages thereof, will be best understood from the following detailed description of a preferred embodiment thereof, when read in conjunction with the accompanying drawings.

In said drawings:

Fig. 5 is a left elevational of the mechanism shown in Fig. 4 showing the adjusting means.

Fig. 6 is a vertical sectional view through the valve for controlling the admission of air to the dashpot.

Fig. 7 is a fragmentary sectional view of a part of the structure shown in Fig. 6 but showing a different valve member.

Fig. 8 is a detail view, partly in section, showing the valve operating armature and the adjusting means for the valve.

Fig. 9 is a schematic diagram showing the range of adjustments of the trip device.

Fig. 10 is an elevational view of a part of the trip device showing the scale plate and the several adjusting knobs of the trip device when arranged for service as a load breaker.

Fig. 11 is a view similar to Fig. 10 but with the trip device arranged for service at another point in the distribution system.

Fig. 13 is a schematic diagram of a group of circuit breakers in a typical distribution system.

Figure 1:
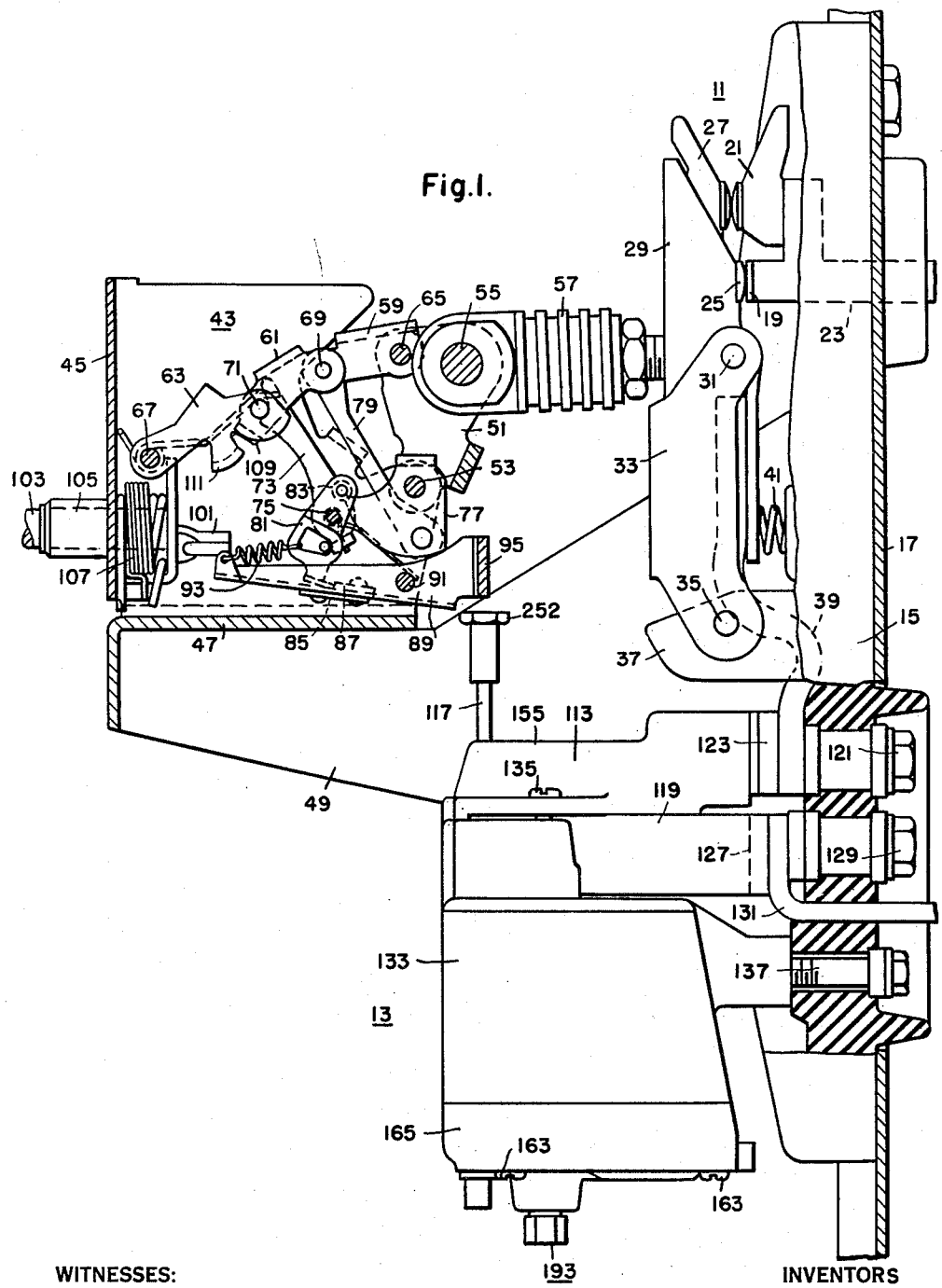
Figure 1 is a side elevational view, partly in section, of a circuit breaker embodying the principles of the invention.

Referring to Fig. 1 of the drawings, the circuit breaker includes a plurality of pole units each comprising a contact structure indicated generally at 11 and an overcurrent trip device indicated generally at 13. The contact structure and the trip device for each pole unit are mounted on a separate insulating base 15 which is rigidly secured to a metal supporting panel 17. Since the pole units are alike, only the center pole unit is illustrated and described herein.

The contact structure 11 comprises stationary main and arcing contacts 19 and 21, both secured to the inner end of a terminal conducting bar 23, and cooperating movable main and arcing contacts 25 and 27. The movable contacts are rigidly secured to a contact-carrying member 29 pivotally mounted by means of a pivot pin 31 and a U-shaped switch arm 33 which, in turn, is pivotally supported by pivot means 35 and brackets 37 rigidly mounted on the base 15.

The movable contact-carrying member 29 is electrically connected by means of a flexible conductor 39 to the energizing coil of the trip device 13. A spring 41 compressed between the member 29 below its pivot 31 and the insulating base 15 provides contact pressure in the closed position of the breaker and also biases the movable contact structure in opening direction.

The movable contact structure is normally maintained in the closed contact position by means of an operating mechanism indicated generally at 43 supported in a U-shaped frame 45. The frame 45 is supported on a platform 47 which forms a cross member of a generally U-shaped main bracket comprising a pair of spaced side members 49 rigidly connected at their outer ends by the cross member or platform 47. The platform 47 extends substantially across the width of the breaker and the side members 49 and is suitably secured to the metal panel 17 on the outside of the two outer pole units of the breaker.

The operating mechanism includes a lever 51 mounted on a pivot pin 53 supported in the side members of the frame 45. The lever 51 carries a rod 55 extending across all of the poles of the breaker and is connected by means of insulating connecting members 57 to the pivot pins 31 in the free ends of the switch arms 33 for the several poles of the breaker so that upon operation of the rod 55 the movable contacts of all of the poles move in unison.

An operating linkage comprising toggle links 59, 61 and 63 is provided to normally hold the lever 51 and consequently the movable contacts in the closed position and to operate the movable contacts to open and closed positions. The toggle link 59 is pivotally connected to the lever 51 by a pivot 65 and the toggle link 63 is pivoted on a fixed pivot 67 supported on the frame 45. The toggle link 61 is pivotally connected to the links 59 and 63 respectively by knee pivots 69 and 71.

The linkage 59, 61, 63 comprises two toggles, one of which 59, 61 may be designated as the tripping toggle and the other 61, 63 as the closing toggle. The tripping toggle 59, 61 is normally slightly underset above a line through the centers of the pivots 65, 71, and the closing toggle 61, 63 is normally underset below a line through the pivots 67, 69. The closing toggle is normally prevented from collapsing downward by a support member 73 pivoted on a pin 75 supported in the frame 45 and having a shouldered portion engaging under the knee pivot 71 of the closing toggle.

The tripping toggle 59, 61 is normally biased in a direction to cause its collapse by a component of the force of the springs 41 which bias the movable contact structures for the three poles of the breaker in opening direction and bias the three connecting members 57 toward the left (Fig. 1). The tripping toggle is normally prevented from collapsing by a main latch member 77 pivoted on the pin 53 and connected by a link 79 to the knee pivot 69 of the tripping toggle.

The main latch member 77 is held in latching position by an intermediate latch lever 81 pivoted on the pin 75. The intermediate latch lever 81 at its upper end carries a latch roller 83 engaging the main latch 77 and at its lower end has a latching portion 85 engaging a latch member 87 on a channel-shaped latch 89 pivoted on a pin 91 in the frame 45. A spring 93 serves to bias the latch lever 81 and the latch 89 to their latching positions.

A trip bar 95, extending across all of the poles of the breaker, is rigidly mounted on the right-hand end of the channel-shaped latch 89 and is adapted to be actuated to effect opening of the breaker by the trip device 13 of any one of the poles in a manner to be presently described.

The breaker is tripped open manually by means of a cam member 101 mounted on the inner end of a handle shaft 103 journalled in a bearing 105 mounted in the front piece of the frame 45. The handle is not shown in the drawings but is rigidly secured to the outer end of the shaft 103 and biased in both directions to a central position in a well known manner by a spring 107.

Rotation of the handle shaft 103 in tripping direction causes the cam member 101 to engage and actuate the latch member 89 in unlatching direction to unlatch the intermediate latch lever 81, which, in turn, releases the main latch 77. This permits the tripping toggle 59, 61 to collapse upwardly to effect opening of the breaker contacts. During the collapse of the tripping toggle, a portion 109 of the toggle link 61 engages and actuates the support member 73 to a non-supporting position, thereby freeing the closing toggle 61, 63. The closing toggle thereupon collapses downwardly and during its collapse resets and relatches the tripping toggle 59, 61.

The breaker contacts may now be operated to the closed position by rotating the shaft 103 and the cam 101 in the direction opposite to the tripping direction. This causes the cam 101 to engage a projection 111 on the closing toggle link 63 and moves this link counterclockwise about its pivot 67. This action straightens the closing toggle until the support member 73 resumes its supporting position below the knee pivot pin 71 of the closing toggle 61, 63. During the closing operation, the link 79 and latch 77 prevents collapse of the tripping toggle 59, 61 which acts as a thrust transmitting means and moves the movable contact structure to the closed position.

The breaker is automatically tripped open by operation of the trip device 13 for any pole of the breaker. The trip device 13 is of the dead front type, that is, the energizing coil is insulated from all other parts of the trip device. This permits adjustments to be made to the trip device with safety and without opening the breaker or deenergizing the power circuit.

Figure 12:
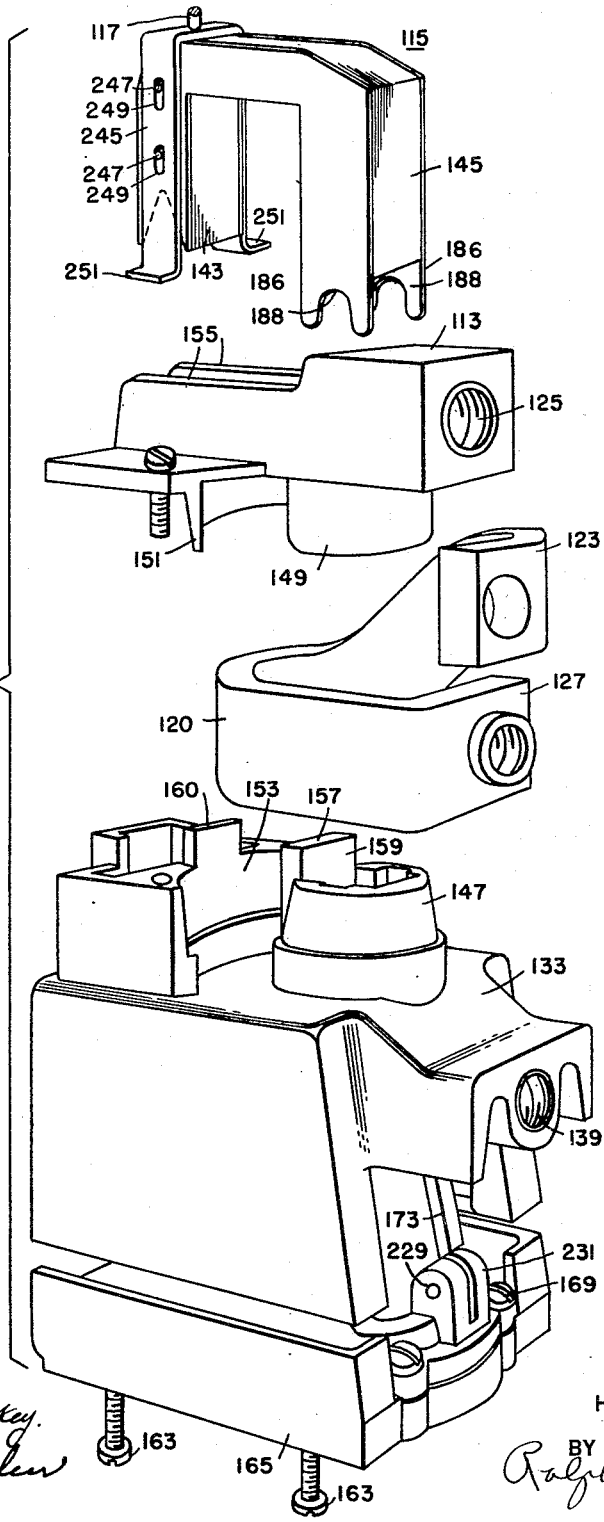
Fig. 12 is an extended perspective view of the elements of the trip device.

The housing for the trip device comprises three separate parts each of molded insulating material. The upper part 113 of the housing supports the magnet yoke 115 (Fig. 2) and a trip rod 117 and insulates the magnet yoke from the energizing coil 119 (Figs. 1 and 2) or 120 as shown in Fig. 12. The upper housing 113 is secured to the base 15 (Fig. 1) by means of a bolt 121 which passes through aligned openings in the base 15, the lower end of the flexible conductor 39, one end 123 of the energizing coil 119 and threadedly engages a metal insert 125 (Fig. 2) molded into the housing 113. The other end 127 of the energizing coil 119 is secured by means of a bolt 129 to the base 15 and to the inner end of a terminal conductor 131.

A center housing portion 133 (Figs. 1 and 2) of molded insulating material is secured by means of screws 135 (only one being shown) to the upper housing 113 and is rigidly secured to the base 15 by means of a bolt 137 which extends through an opening in the base 15 and threadedly engages a metal insert 139 (Fig. 2) molded in the housing 133.

Supported in the upper housing 113 is the U-shaped laminated magnet yoke 115 having its legs 143 and 145 extending downwardly through openings in the upper housing 113 and corresponding openings in the center housing portion 133. The center housing 133 has an annular projection 147 (Figs. 2 and 12) surrounding the leg 145 of the magnet yoke and the projection 147 extends upwardly in nested relation with an annular flange 149 of the upper housing 113 to insulate the leg 145 of magnet yoke 115 from the energizing coil 119. An arcuate flange 151 on the upper housing 113 cooperates with an arcuate portion 153 of the center housing 133 to insulate the leg 143 of the magnet yoke from the energizing coil 119. The top portion (Fig. 2) of the magnet yoke 115 rests in a channel formed by side portions 155 of the upper housing 113.

The magnet yoke 115 is supported and located in the housing by surfaces 157 and 159 and 160 on the center housing 133 and by an angular surface 161 on the upper housing 113. The magnet yoke 115 is first assembled in the upper housing and the upper and center housings 113 and 133 are then secured together by the screws 135 one of which is shown in Fig. 1. This forces the surface 161 against the beveled corner of the magnet yoke 115 and seats the yoke against the surfaces 157, 160 and 159 of the center housing 133 thus rigidly holding the magnet yoke in its proper position relative to the housing and the other parts of the trip device.

Mounted on the bottom of the center housing 133 and secured thereto by means of screws 163 (Figs. 1 and 3) is a base or support 165 of molded insulating material on which are mounted the other parts of the trip device and the time delay device. Secured to the base 165 by means of screws 169 (Figs. 2 and 3) is a diaphragm clamp and armature support member 171 of molded insulating material. Spaced members 173 molded integral with the member 171 extend upwardly therefrom and are joined by an integral cross member 175 (Fig. 2).

Figure 2:
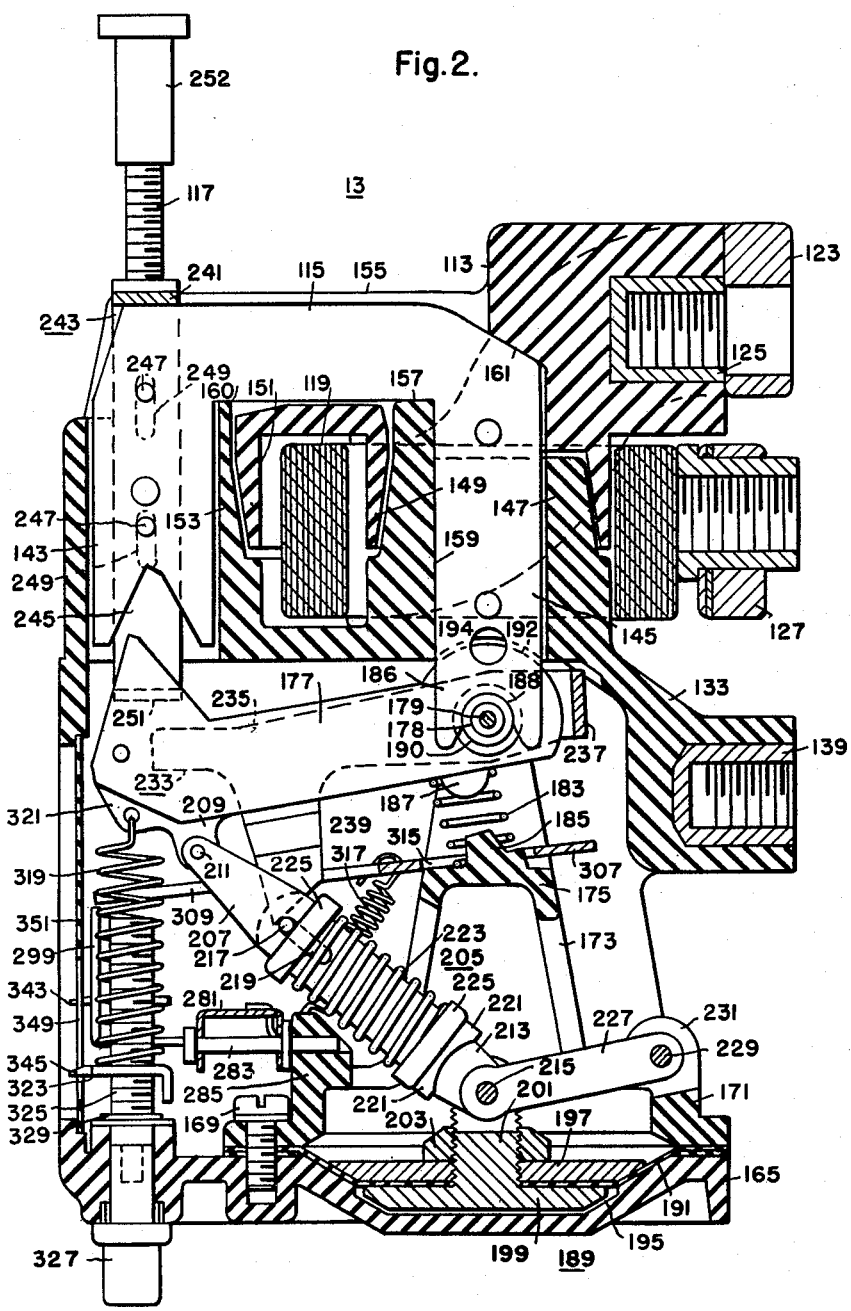
Fig. 2 is an enlarged sectional view through the trip device taken substantially along line II—II of Fig. 3 and showing the magnet structure and the time-delay device.
Figure 3:
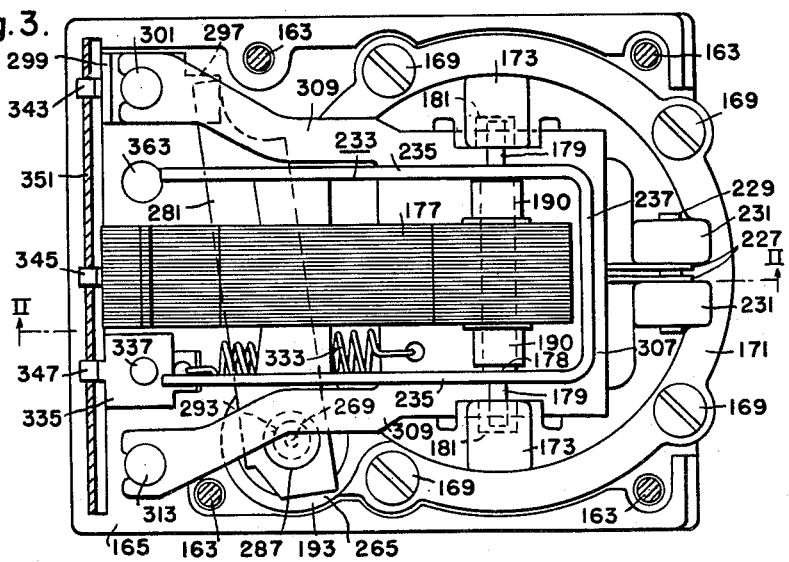
Fig. 3 is a top plan view of the armature structure and the time delay device shown in Fig. 4.
Figure 4:
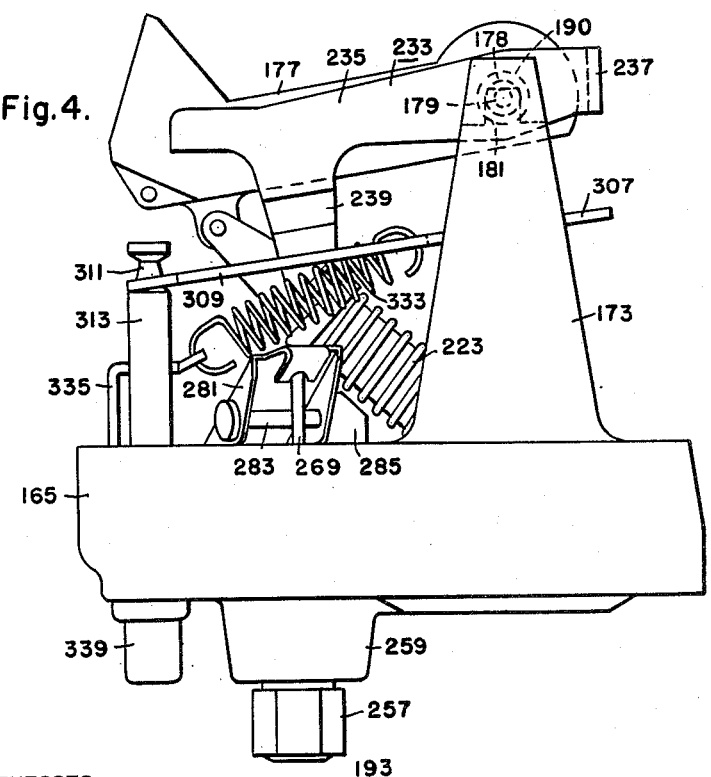
Fig. 4 is a front elevational view of the time-delay device including the tripping armature with the intermediate housing, the magnet yoke and the coil removed.

As shown in Figs. 4 and 5, all of the parts illustrated as mounted on the base 165 are assembled thereon before the member is mounted on the center housing member 133 (Figs. 1 and 2). These parts include a main armature 177 for cooperating with the magnet yoke 115 (Fig. 2). The main armature 177 is of laminated construction and has a bearing sleeve 178 mounted therein and a pin 179 extends therethrough (Figs. 4 and 5). The ends of the pin 179 are disposed in recesses 181 formed in the upper ends of the spaced members 173. When assembled in the lower support member the armature 177 is biased upwardly, biasing the ends of the pin 179 into the recesses 181 and retained in the position shown by a spring 183 (Fig. 2) compressed between the cross members 175 and the bottom surface of the armature. The spring 183 engages a spring guide 185 on the cross member 175 and a spring guide 187 on the armature.

Referring to Fig. 12 which comprises an extended view of the several elements of the trip device, it would be seen that the outer laminations 186 of the magnet yoke 115 extend downwardly from the lower end of the leg 145 of the yoke and are provided with recesses 188 therein. After the magnet yoke 115 is inserted into the upper housing member 113 and this member is attached to the center housing member 133 with an energizing coil 120 between the upper and center housing members, the base 165 with all of the parts (Fig. 4) mounted thereon is inserted upwardly into the center housing portion 133 and is secured thereto by the screws 163.

As the bottom assemblage of parts (Fig. 4) is placed in position in the center housing 133, bushings 190 (Figs. 2, 3, 4) mounted on the bearing 178 and disposed one on each side of the armature 177 engage the recesses 188 in the outer laminations 186 of the magnet yoke 115. The base 165 is moved into the center housing member 133 slightly beyond the point where the bushings 190 engage the recesses 188. This causes the ends of the pin 179 to separate slightly from the upper walls of the recesses 181 in the members 173, slightly compressing the spring 183 and accurately locates the armature 177 relative to the magnet yoke 115 and the armature, when actuated, will cause the bearing sleeve 178 to pivot in the bushings 190.

As seen in Fig. 2 when the lower assemblage of parts is placed in position and the bushings 190 are seated in the recesses 188, an arcuate surface 192 on the armature 177 adjacent the pivoted end thereof cooperates with an arcuate surface 194 on the lower end of the leg 145 of the magnet yoke to provide a constant predetermined air gap between the pivoted end of the armature and the magnet yoke in all positions of the armature.

The armature 177 is actuated to effect tripping of the breaker under the control of a time delay device 189 (Fig. 2) which comprises generally a flexible diaphragm 191 and a valve device 193 (Fig. 6) for admitting air to the space below the diaphragm at various rates. The flexible diaphragm 191 is disposed in a chamber 195 formed in the base 165. The outer edge of the diaphragm 191 is clamped between the rim of the member 171 and the base 165 with a sealing gasket disposed between the diaphragm and the base 165. The central portion of the diaphragm 191 is clamped between upper and lower clamp members 197 and 199, respectively, the lower clamp member 199 having a central threaded stud 201 extending upwardly through an opening in the upper clamp member. A nut 203 is threaded onto the stud 201 and securely clamps the parts together. The armature 177 is connected to the diaphragm by means of a linkage indicated generally at 205 (Fig. 2) which comprises a pair of spaced links 207 (only one being shown) disposed one on each side of an ear 209 on the armature and pivotally connected thereto means of a pin 211. A single link 213 disposed between the links 207 is pivotally connected by means of a pin 215 to the bifurcated upper end of the stud 201. The link 213 carries a pin 217 which extends laterally on both sides thereof through slots 219 (only one being shown) in the links 207. The links 207 at their ends adjacent the diaphragm are provided with retaining lugs 221 and a coil spring 223 surrounding the linkage is compressed between spring retainers 225 supported on the pin 217 and the lugs 221 with a predetermined initial compression. Guide links 227 (Figs. 2 and 3) having one end pivoted on a fixed pivot pin 229 supported in spaced bosses 231 formed on the base of the member 171 are pivotally connected at their other ends to the pin 215 which connects the linkage 205 to the stud 201 to guide the movement of the diaphragm.

A U-shaped follow lever 233 (Figs. 2, 3, 4 and 5) comprising spaced levers 235 joined at one end by an integral yoke portion 237 straddles the armature 177 and is pivotally supported on opposite sides of the armature on the pin 179. Each of the levers 235 has a depending portion 239 formed inwardly toward each other below the armature 177 (Fig. 5) and the lower ends of the portions 239 rest on the pin 217 (see also Fig. 2), so that upward movement of the pin 217 causes clockwise movement of the follow lever 233 about the pin 179 to effect tripping operation of the trip rod 117.

The trip rod 117 is rigidly mounted on the yoke portion 241 of an inverted U-shaped member 243, the legs 245 of which straddle the leg 143 of the magnet yoke 115. The member 243 is disposed for vertical movement and is guided by pins 247 projecting from opposite sides of the leg 143 of the magnet yoke engaging elongated slots 249 in the legs 245 of the U-shaped members 243. Ears 251 formed outwardly from the lower ends of the legs 245 are disposed in the path of upward movement of the follow levers 235 (see Fig. 5) so that actuation of the follow levers 235 causes the free ends of the levers 235 to engage the ears 251 and move the member 243 and the trip rod 117 upwardly to cause a thimble 252 thereon to engage and actuate the trip bar 95 (Fig. 1) and trip the breaker.

The rate of tripping movement of the armature 177 and the follow lever 233 is controlled by the movement of the diaphragm 191 which, in turn, is controlled by the rate of admission of air to the chamber 195 (Fig. 2) below the diaphragm. Air is admitted to the chamber 195 upon upward movement of the diaphragm by means of the valve device 193 (Figs. 1, 3, 4 and 6). As best shown in Fig. 6, the valve 193 comprises a valve insert 253 disposed in an opening 255 in the base 165 and held firmly in place by a plug 257 threaded into a cylindrical projection 259 extending downwardly from the base 165. A piston valve 261 is disposed in the bore of the valve insert 253 and is biased upwardly by a spring 263. A portion 265 of the diaphragm clamp member 171 fits over a projection 267 of the base 165 and a valve operating rod 269 extends through openings in the portion 265 and projection 267 and has a tapered lower end seated in a conical opening in the valve 261 to operate the piston valve 261. A plurality of openings 271 in the top of the portion 265 admits air through a filter 273 and a central opening in the projection 267 to the upper end of the valve 261.

An annular groove 275 about the midportion of the valve insert 253 communicates by means of an orifice 277 in the valve insert to the bore of the insert and also communicates by means of a passage 279 in the base 165 to the chamber 195 below the diaphragm 191. Thus when the armature 177 (Fig. 2) acting through the linkage 205 moves the diaphragm 191 upwardly, air will be admitted to the chamber 195 through the openings 271, filter 273, the central opening in the projection 267, through the space between the valve 261 and the bore of the insert 253, passages 277, groove 275 and the passage 279 to the chamber 195.

The amount of time delay provided in the operation of the trip device to trip the breaker is determined by the rate of flow of air past the piston valve 261. The rate of flow of air is determined by the distance the air is required to flow past the piston valve 261. By varying the distance the air has to flow past the piston valve the rate of flow of the air is varied, which varies the amount of time delay introduced into tripping action of the device. The distance the air is required to flow past the valve 261 is varied by varying the position of the valve relative to the orifice 277 in the insert 253.

The means for varying the position of the valve 261 comprises a channel-shaped lever 281 (Figs. 2, 3, 4, 5 and 6) pivotally mounted on a pin 283 supported in a projection 285 of the member 171.

At its right-hand end (Figs. 3 and 4) the lever 281 is provided with a conical depression 287 in which is seated a conical surface 291 of a collar 293 secured to the valve rod 269. As shown in Fig. 5, the left-hand end of the lever 281 has a rounded portion 295 which is biased by the valve spring 263 (Fig. 6) into engagement with an angular portion 297 of a bracket 299. The portion 297 of the bracket threadedly engages a screw 301 (Fig. 5), rotatably mounted in the base of the lower housing 165. The screw 301 has a knob 303 secured to its lower end below the housing member 165 and is retained in place by a spring washer 305 engaged in a groove in the screw just above the base 165.

By rotating the knob 303 and consequently the screw 301 the bracket 299 is moved up or down on the screw depending on the direction of rotation of the knob. This rotates the lever 281 which, through the engagement of the conical depression 287 (Fig. 6) thereon with the valve rod 269, positions the valve rod and the valve 261 accordingly. With the valve 261 in the position in which it is shown in Fig. 6 a relatively long time delay is provided in the operation of the trip device.

The valve 261 is also operated to full open position to provide instantaneous tripping. The valve 261 is operated to full open position by a secondary armature 307 (Figs. 2, 3, 4 and 5). The armature 307 is generally U-shaped and the two legs 309 thereof are pivotally supported in grooves 311 in the upper ends of the adjusting screw 301 and the upper end of a stud 313 (Figs. 3 and 5) rigidly mounted in the base 165. As best seen in Fig. 2, the armature 307 adjacent its right-hand end is provided with a clearance opening 315 for the spring 183 and the spring guide 185, the armature 307 in its retracted position resting on the cross member 175 of the armature support 173. The armature 307 is connected to the lever 281 at the left of the pivot pin 283 (Fig. 5) by means of a spring 317 so that upon operation of the armature 307 in a counterclockwise direction (Figs. 2 and 4) the lever 281 will be rotated clockwise (Fig. 5) to move the valve 261 (Fig. 6) to its open position, this movement of the lever 281 being limited by engagement of the valve element 261 with the bottom of the opening in plug 257. When the valve 261 (Fig. 6) is thus moved downwardly it opens the previously described passages and permits a free flow of air to the chamber 195 so that the trip device functions instantaneously to trip the breaker.

The main armature 177 is biased to its unattracted position by means of a spring 319 (Figs. 2 and 5) having one end connected to a projection 321 on the end of the armature and the other end connected to an adjustable member 323. The member 323 threadedly engages a screw 325 mounted for rotation in the base 165 and having an insulating knob 327 secured to the lower end thereof below the base, the screw 325 being held in place by a spring washer 329 engaging a groove in the screw just above the base. By rotating the screw 325 the member 323 travels up or down the screw depending upon the direction of rotation of the screw, thus varying the tension of the spring which varies the magnitude of overload current required to pick-up the armature 177.

The pick-up point for the secondary or instantaneous armature 307 may be similarly adjusted. The armature 307 is biased to its unattracted position (Figs. 2, 4 and 5) by means of a spring 333 (Figs. 3, 4 and 5) having one end connected to the armature and the other end connected to an adjustable member 335 threadedly engaging a screw 337 rotatably mounted in the base 165. The screw 337 has a knob 339 secured to the lower end thereof and is held in place by a spring washer 341 engaging a groove in the screw 337 just above the base 165. Rotation of the screw 337 by the knob 339 moves the member 335 up and down according to the direction the screw is turned to vary the tension of the spring 333 which varies the pick-up point of the armature 307.

The adjustable members 299, 323 and 335 respectively are provided with indicating means comprising projections 343, 345 and 347 (Figs. 3 and 5) which engage vertical slots 349 (Fig. 10) in an index plate 351 supported between the center housing 133 and the lower housing 165 (see also Fig. 10).

The trip device just described will trip the circuit breaker instantaneously in response to overload currents above a predetermined value and after a time delay on overload currents below the predetermined value. This tripping arrangement is used on the load breakers of a distribution system to protect the load. However, the feeder breaker in such a system should not trip instantaneously in order to give the load breaker time to trip out and clear the fault. For this reason the feeder breakers of the system are provided with a short time delay trip for the higher overload currents and a long time delay for the lower overload currents.

Figs. 7 and 8 illustrate the trip device arranged for long time delay and short time delay tripping. This is effected by replacing the valve element 261 (Fig. 6) with a valve element 353 (Fig. 7) of slightly different form and providing a bracket 355 (Fig. 8) and adjusting screw 357 for controlling the amount of movement of the valve element 353. The adjusting screw 357 is mounted for rotation in the base 165 and has an insulating knob 359 fixed to the lower end thereof below the housing. A spring clip 361 engages a groove in the screw above the housing base to hold the screw in position. The screw 357 is mounted in an opening 363 (Fig. 3) in the base of the housing member 165 between the long time delay adjusting screw 301 (Fig. 5) and the long time delay pick-up adjusting screw 325. The lower portion of the adjusting screw 357 is threaded and engages a threaded opening in the lower leg of the bracket 355. The upper end 365 of the screw 357 is of reduced cross-section and passes through a clearance opening in the upper leg of the bracket 355. The reduced portion 365 of the screw 357 is threaded and engages a tapped opening in an indicator 367. The thread on the reduced upper end 365 of the screw 357 has approximately twice the lead as the thread on the lower portion, hence, for one rotation of the adjusting screw the indicating member 367 will move twice the distance as the bracket 355. This makes possible an expanded dial on the index plate 351 and provides a more accurate setting of the short time delay device.

The bracket 355 (Fig. 8) is provided with a portion 369 which extends above the lever 281 to limit the movement thereof and also has a lateral projection 371 which extends above the angular portion 297 of the long time delay adjusting bracket 299 to limit the adjustment of the latter relative to the short time delay adjusting bracket 355. Since the movement of the lever 281 is limited by the bracket 355, the spring 317 (Fig. 5) permits full operation of the secondary armature 307 upon energization of the electromagnet in response to higher overload currents.

With the valve element 353 (Fig. 7) in the position shown, a long time delay is provided in the operation of the trip device by the restricted passage between the valve element 353 and the bore of the insert 253. The position of the valve element 353 is adjusted in the same manner as the valve element 261 (Fig. 6), that is, by the screw 301 (Fig. 5) and the bracket 299. The upper end of the valve element 353 (Fig. 7) is slightly tapered so that when this element is moved downward by operation of the secondary armature 307 (Fig. 8) acting through the spring 373 and lever 281 a portion of the tapered end of the valve element is positioned opposite the orifice 277 thus permitting a free flow of air to the chamber 195 to provide the short time delay action but not sufficient to effect instantaneous tripping. The amount of downward movement of the valve element 353 (Fig. 7) is controlled by the lever 281 (Fig. 8) striking the projection 369 on the bracket 355. Adjustment of the bracket 355, therefore, varies the extent of downward movement of the valve 353 and the amount of the tapered portion of the valve positioned opposite the orifice 277 thus varying the amount of short time delay provided.

Means is provided to exhaust the air from the chamber 195 below the diaphragm 191 following a tripping operation to permit resetting of the parts to their normal positions. This means comprises a ball valve 375 (Fig. 6) disposed in an opening in the plug 257. The ball valve 375 is biased upwardly against a valve seat in the plug 257 by a very light spring 377 which is retained by an orificed washer 379. The washer 379 is held in position by forming a portion of the plug 257 over against the bottom of the washer.

After the circuit breaker has been tripped open or if a fault has occurred and cleared before the breaker is tripped, the parts of the trip device are reset by the weight of the armature 177 and the force of the spring 319 (Fig. 2) applied to the diaphragm 191. This forces the air from the chamber 195 out through the passage 279 (Fig. 6) through the space 255 between the lower part of the valve member 253 and the portion 259 of the base, through openings 260 in the bottom of the insert 253, and through an orifice 381 in the plug 257 past the ball valve 375 to atmosphere, the pressure forcing the ball valve 375 open to exhaust the air. When the air has been exhausted from the chamber 195 to a predetermined pressure the spring 377 reseats the ball valve to prevent air from entering through the orifice 381 upon operation of the trip device.

The herein disclosed circuit breaker is well adapted for the protection of distribution systems. Such systems, a typical distribution system being shown schematically in Fig. 13, are usually protected by a series of breakers including a generator breaker 383, bus tie-in breakers 385, feeder breakers 387, and load breakers 389. The circuit breakers of such a system are usually set for selective tripping, that is, if a fault should occur at a point in the system, the breaker nearest the fault and on the generator side of the fault should open to clear the fault condition. By assembling the trip device with the long time delay valve structure shown in Fig. 6 and omitting the short time delay adjusting means of Fig. 8 the breaker is adapted to be used as a load breaker. The load breaker may be adjusted to trip out after a relatively long time delay in response to overload currents up to, for instance, 1000% of normal rated current, and instantaneously in response to overload currents above 1000% of normal rated current or short circuit currents.

For service in other positions of the system, for instance, as a bus tie-in or feeder breaker, the valve element 353 (Fig. 7) in substituted for the valve element 261 of Fig. 6 and the short time delay adjusting means of Fig. 8 is assembled in the trip device. The circuit breaker will then trip and after a long time delay in response to overload currents, up to, for instance, 500% of normal rated current and after a relatively short time delay in response to overload currents above 500% of normal rated currents.

The time-current requirement of the trip device varies with the position of the breaker in the selective system for which reason a trip device providing a wide range of adjustment is essential.

As illustrated in Fig. 9, the trip device is capable of a wide range of adjustments. Considering first the load breaker, there are three separate adjusting devices all located for ease of accessibility. By way of example of the range of adjustment, the following have been arbitrarily selected for illustrative purpose:

1. Range of long time delay pick-up, from 80% to 160% of coil rating.
2. Range of long time delay from 5 to 25 seconds.
3. Range of instantaneous pick-up, from 500% to 1500% of coil rating.

When used as a feeder or bus tie-in breaker four separate adjusting devices are provided all located for ease of accessibility. The range of adjustment of these devices are arbitrarily selected as follows:

1. Range of long time delay pick-up, from 80% to 160% of coil rating.
2. Range of long time delay, from 30 to 60 seconds.
3. Range of short time delay pick-up from 500% to 1000% of coil rating.
4. Range of short time delay, from 6 to 30 cycles.

Figure 9 graphically illustrates the ranges of the several adjustments of the trip device, the range of adjustments for the load breaker being shown by full lines and for the feeder breaker by dotted lines. Along the left-hand edge of Fig. 9 is indicated the time in seconds and at the right-hand edge is indicated the time in cycles based on 60 cycle frequency. At the bottom is indicated the percent of said rating. The curve A represents the minimum settings of the adjustments for the load breaker, the curve A' representing the minimum settings for the feeder or other breakers. The corresponding maximum settings are represented by the curves B and B'. By adjusting the knob 327 (Figs. 5 and 10) the long time delay pick-up may be adjusted to pick-up at any point in the band of adjustments defined by curves A and B as indicated at C, that is, by way of example, between 80% and 160% of coil rating. Adjusting the knob 303 (Figs. 5 and 10) which controls the position of the valve element 261 (Fig. 6) varies the amount of long time delay between 5 and 25 seconds as indicated at D in Fig. 9. As indicated at E (Fig. 9) the instantaneous pick-up point may be varied between 500% and 1500% of coil rating by adjusting the knob 339 (Figs. 5 and 10) which controls the tension of the biasing spring 333 (Figs. 3, 4 and 5) for the secondary armature 307 which operates the valve 261 (Fig. 6).

When the trip device is arranged for service as a feeder or bus tie-in breaker the range of adjustments is shown by the dotted lines A' and B' in Fig. 9. The long time delay pick-up is adjusted by the same knob 327 (Fig. 11) and over the same range as the load breaker as indicated at C in Fig. 9. Also the amount of long time delay is adjusted by the knob 303, however, in the case of the feeder breaker this range is between approximately 30 and 60 seconds as indicated at F (Fig. 9). The short time delay pick-up is adjusted by the knob 339 (Fig. 11) which adjusts the bias of the biasing spring 333 (Figs. 3, 4 and 5) for the secondary armature 307. As indicated at G in Fig. 9 the short time delay pick-up may be set to pick up between 500% and 1000% of coil rating. The amount of short time delay may be varied between 5 and 30 cycles, as indicated at H, by adjusting the knob 359 (Figs. 9 and 11).

Each of the adjustments may be made by merely turning the adjusting knob associated with the particular adjusting device. The adjustments are independent of one another and all of the adjusting knobs are conveniently located. All of the operating parts except the trip rod are mounted on the base 165 which is readily removable so that all of the parts are easily accessible for assembly, checking and adjustment. Series coils of different ratings are readily interchangeable and are fully insulated from the magnetic circuit and from all other parts of the trip device by the insulating housing, thus permitting adjustments to the trip device to be made without opening the breaker or otherwise deenergizing the power circuit.

While the form of mechanism shown and described herein is admirably adapted to fulfill the objects primarily stated, it is to be understood that it is not intended to confine the invention to the form or embodiment disclosed herein, for it is susceptible of embodiment in various forms without departing from the spirit of the invention.

We claim as our invention:

1. In a circuit breaker comprising relatively movable contacts and operating means therefor, the combination of an electromagnetic trip device comprising a magnet yoke, an energizing winding, an armature movable upon energization of said winding in response to abnormal circuit conditions, a trip member slidably mounted on said magnet yoke, a time delay element for retarding movement of said armature, a toggle connecting the armature to said time delay element, said toggle having one end connected to said armature and having its knee connected to said time delay element, a member movable by a part engaged and moved with said toggle for engaging and moving said trip member, means defining a passage for admitting air to said time delay element, and a valve disposed in said passage for controlling the rate of admission of air to said time delay element to thereby control the rate of tripping movement of said armature.

2. In a circuit breaker comprising relatively movable contacts and operating means therefor, the combination of an electromagnetic trip device comprising a magnet yoke, an energizing winding, an armature movable upon energization of said winding in response to abnormal circuit conditions, a trip member slidably mounted on said magnet yoke, a time delay element for retarding movement of said armature, a toggle connecting the armature to said time delay element, said toggle having one end connected to said armature and having its other end supported on a fixed pivot, said toggle having its knee connected to said time delay element, a member engaged and moved by said toggle for engaging and moving said trip member, means defining a passage for admitting air to said time delay element, and a valve disposed in said passage for controlling the rate of admission of air to said time delay element to thereby control the rate of tripping movement of said armature.

3. In a circuit breaker comprising relatively movable contacts and operating mechanism therefor, the combination of an electromagnetic trip device comprising a magnet yoke, an energizing coil, an armature movable upon energization of said coil in response to overload currents, a trip member slidably mounted on said magnet yoke, a time delay element comprising a movable abutment for retarding movement of said armature, a toggle connecting said armature to said abutment, said toggle having one end connected to said armature and the other end pivoted on a fixed pivot, the knee of said toggle being connected directly to said movable abutment, a member engaged and moved by said toggle for engaging and actuating said trip member, means defining a passage for admitting air to said movable abutment, and a valve disposed in said passage for controlling the rate of admission of air to said movable abutment to thereby control the rate of tripping movement of said armature.

4. In a circuit breaker comprising relatively movable contacts and operating means therefor, the combination of an electromagnetic trip device comprising a U-shaped magnet yoke, an energizing coil, a pivoted armature movable upon energization of said coil in response to overload currents, a trip member slidably mounted on one leg of said U-shaped magnet yoke, a time delay element comprising a movable abutment for retarding movement of said armature, a toggle connecting said armature to said abutment, said toggle being operated by said armature and having a part connected to said movable abutment, a pivoted lever engaged and moved by said toggle for engaging and actuating said trip member, and a valve controlling a passage for admitting fluid to said movable abutment at a predetermined rate to provide a time delay in the operation of said armature.

5. In a circuit breaker comprising relatively movable contacts and operating means therefor, the combination of an electromagnetic trip device comprising a magnet yoke, an energizing winding, an armature movable upon energization of said winding in response to overload currents, a trip member mounted on said magnet yoke, a time delay element for retarding movement of said armature, a toggle operable by said armature, a member operable by said toggle for engaging and actuating said trip member, a valve controlling a passage normally admitting fluid at a predetermined rate to said time delay element to direct a predetermined time delay in the operation of said armature, a lever for actuating said valve to increase the rate of admission of fluid to said time delay element to thereby decrease the time delay, and a secondary armature connected to said lever and operable in response to certain overload currents to actuate said lever.

6. In a circuit breaker comprising relatively movable contacts and operating means therefor, the combination of an electromagnetic trip device comprising a magnet yoke, an energizing winding, an armature movable upon energization of said winding in response to overload currents, a trip member mounted on said magnet yoke, a time delay element for retarding movement of said armature, a toggle operable by said armature, a member operable by said toggle for engaging and actuating said trip member, a valve controlling a passage normally admitting fluid at a predetermined rate to said time delay element to effect a predetermined time delay in the operation of said armature, a lever for actuating said valve to increase the rate of admission of fluid to said time delay element to thereby decrease the time delay, adjusting means for adjusting the position of said lever to thereby adjust the initial position of said valve and a secondary armature connected to said lever and operable in response to certain overload currents to actuate said lever.

7. In a circuit breaker comprising relatively movable contacts and operating means therefor, the combination of an electromagnetic trip device comprising a magnet yoke, an energizing winding, an armature movable upon energization of said winding in response to overload currents, a trip member mounted on said magnet yoke, a time delay element for retarding movement of said armature, a toggle operable by said armature, a member operable by said toggle for engaging and actuating said trip member, a valve controlling a passage normally admitting fluid at a predetermined rate to said time delay element to effect a predetermined time delay in the operation of said armature, a lever for actuating said valve to increase the rate of admission of fluid to said time delay element to thereby decrease the time delay, adjusting means for adjusting the position of said lever to thereby adjust the initial position of said valve, a secondary armature connected to said lever and operable in response to certain overload currents to actuate said lever, and an adjustable stop for limiting the movement of said lever by said secondary armature.

8. In a circuit breaker comprising relatively movable contacts and operating means therefor, the combination of an electromagnetic trip device comprising a magnet yoke, an energizing coil, an armature movable upon energization of said coil in response to overload currents, a trip member movable to effect a tripping operation, a dashpot for retarding tripping operation of said armature, a linkage having one end connected to said armature and the other end pivoted on a fixed pivot, said linkage being also connected to said dashpot and being operable by said armature, a member operated by said linkage for engaging and moving said trip member, a piston valve controlling a passage for normally admitting fluid to said dashpot, said valve having a normal position in which it admits fluid to said dashpot at a predetermined rate to effect a time delay in the operation of said armature and movable to a second position to increase the rate of admission of fluid to said dashpot, a pivoted lever for moving said valve to said second position, and a second armature having a connection with said lever for actuating said lever.

9. In a circuit breaker comprising relatively movable contacts and operating means therefor, the combination of a trip device comprising separable housing members of molded insulating material, a magnet yoke, an energized coil, said housing members having surfaces and projections molded integral therewith for receiving and supporting said magnet yoke and for insulating said magnet yoke from said energizing coil, a trip member mounted on said magnet yoke and movable to effect a tripping operation, a base member also of molded insulating material removably supported on one of said housing members, a movable armature supported on said base member and biased into cooperative relation with said magnet yoke, a dashpot mounted on said base member for retarding tripping operation of said armature, a linkage having one end connected to said armature and the other end pivotally supported on said base member, said linkage being also connected to said dashpot and operable by said armature, a member mounted on said base and operable by said linkage for engaging and actuating said trip member, a valve mounted in said base member and controlling a passage for admitting fluid to said dashpot, and said base member and all of said parts supported thereon being removable without disengaging any connection.

10. In a circuit breaker comprising relatively movable contacts and operating means therefor, the combination of a trip device comprising separable housing members of molded insulating material, a U-shaped magnet yoke, an energizing coil, said housing members having surfaces and projections molded integral therewith for receiving and supporting said magnet yoke and for insulating said magnet yoke from said energizing coil, a trip member mounted on said magnet yoke and movable to effect a tripping operation, a base member also of molded insulating material removably supported on one of said housing members, a movable armature supported on said base member and biased into cooperative relation with one leg of said magnet yoke, a dashpot mounted on said base member for retarding tripping operation of said armature, a linkage having one end connected to said armature and the other end pivotally supported on said base member, said linkage being also connected to said dashpot and operable by said armature, a member mounted on said base and operable by said linkage for engaging and actuating said trip member, a valve mounted in said base member and controlling a passage for admitting fluid to said dashpot, and said base member and all of said parts supported thereon being removable without disengaging any connection.

11. In a circuit breaker comprising relatively movable contacts and operating means therefor, the combination of a trip device comprising separable housing members of molded insulating material, a U-shaped magnet yoke, an energizing coil, said housing members having surfaces and projections molded integral therewith for receiving and supporting said magnet yoke and for insulating said magnet yoke from said energizing coil, a trip member mounted on said magnet yoke and movable to effect a tripping operation, a base member also of molded insulating material removably supported on one of said housing members, a movable armature supported on said base member and biased into cooperative relation with one leg of said U-shaped magnet yoke, a dashpot mounted on said base member for retarding tripping operation of said armature, a toggle having one end connected to said armature and the other end pivotally supported on said base member, said toggle being also connected to said dashpot and operable by said armature, a member mounted on said base and operable by said toggle for engaging and actuating said trip member, a valve mounted in said base member and controlling a passage for admitting fluid to said dashpot, and said base member and all of said parts supported thereon being removable without disengaging any connection.

12. In a circuit breaker comprising relatively movable contacts and operating means therefor, the combination of a trip device comprising separable housing members of molded insulating material, a U-shaped magnet yoke supported in said housing members, an energizing winding, said housing members having recesses and projections completely insulating said trip device from said energizing winding, a trip member slidably mounted on one leg of said magnet yoke and movable to effect a tripping operation, a base member also of molded insulating material removably supported on one of said housing members, a movable armature supported on said base and having pivot means thereon, biasing means biasing said pivot means into cooperative relation with the other leg of said U-shaped magnet yoke, a time delay element including a chamber for retarding tripping movement of said armature, a toggle having one end connected to said armature and the other end pivotally supported on said base member, said toggle having its knee connected to said time delay element, a member movable by said toggle for engaging and moving said trip member, a valve controlling a passage in said base member for admitting fluid to said chamber, and said base member including all of the parts mounted thereon being separable from said one housing member without disengaging any connections.

13. In a circuit breaker comprising relatively movable contacts and operating means therefor, the combination of a trip device comprising separable housing members of molded insulating material, a U-shaped magnet yoke supported in said housing members, an energizing winding, said housing members having recesses and projections completely insulating said trip device from said energizing winding, a trip member slidably mounted on one leg of said magnet yoke and movable to effect a tripping operation, a base member also of molded insulating material removably supported on one of said housing members, a movable armature supported on said base and having pivot means thereon, biasing means biasing said pivot means into cooperative relation with the other leg of said U-shaped magnet yoke, a time delay element including a chamber for retarding tripping movement of said armature, a toggle having one end connected to said armature and the other end pivotally supported on said base member, said toggle having its knee connected to said time delay element, a member pivoted on said pivot means and movable by said toggle for engaging and moving said trip member, a valve controlling a passage in said base member for admitting fluid to said chamber, and said base member including all of the parts mounted thereon being separable from said one housing member without disengaging any connections.

14. In a circuit breaker comprising relatively movable contacts and operating means therefor, the combination of a trip device comprising separable housing members of molded insulating material, a U-shaped magnet yoke provided with spaced extensions on one leg thereof, said housing members having recesses and surfaces for receiving and supporting said magnet yoke, an energizing winding, said housing members having cooperating projections for insulating said trip device from said energizing winding, a trip member mounted on the other leg of said magnet yoke and movable to effect a tripping operation, a base member also of molded insulating material removably supported on one of said housing members, an armature supported on said base member and having pivot means on one end thereof, a spring biasing said pivot means into cooperative relation with said spaced extensions, a time delay element mounted on said base member including a chamber for retarding tripping movement of said armature, a toggle having one end connected to the other end of said armature and the other end pivotally supported on said base member, the knee of said toggle being connected to said time delay element, a member pivoted on said pivot means and movable by said toggle to engage and move said trip member, a valve controlling a passage in said base member for admitting fluid to said chamber at a predetermined rate to provide a time delay in the tripping movement of said armature, adjusting means mounted on said base member for varying the position of said valve, and said base member together with all of said elements mounted thereon being removable without disengaging any connection.

15. In a circuit breaker comprising relatively movable contacts and operating means therefor, the combination of an insulating housing comprising a plurality of separable members, a U-shaped magnet yoke one leg of which is provided with spaced extensions having recesses formed thereon, two of said housing members cooperating to rigidly support said magnet yoke, an energizing coil disposed between said two housing members and surrounding said one leg of said magnet yoke, said two housing members having projections thereon cooperating to insulate said magnet yoke from said energizing winding, a trip member, a third housing member supported on one of said two housing members, a movable armature operable upon energizing of said winding in response to overload currents, spring means resiliently supporting said armature on said third housing member, pivot means on said armature adjacent one end thereof, said spring means normally biasing said pivot means into engagement with said extensions, a time delay device mounted on said third housing member comprising a movable abutment for retarding tripping movement of said armature, a linkage having one end connected to said armature and the other end pivotally supported on said third housing member, said linkage being connected at a point intermediate its ends to said movable abutment, a member pivotally supported on said pivot means operable by said linkage to engage and actuate said trip member, a valve disposed in a passage in said third housing member for controlling the admission of fluid to said movable abutment to provide a predetermined time delay in the operation of said armature, a valve operating lever pivotally supported on said third housing member for operating said valve to increase the rate of admission of fluid to said movable abutment to decrease the time delay in the operation of said armature, a second armature pivotally supported on said third housing member for operating said valve, and said third housing member and the parts mounted thereon being removable without disturbing the calibration of said trip device, and without disengaging any connections.

References Cited in the file of this patent

UNITED STATES PATENTS

| Number | Name | Date |
|---|---|---|
| 1,315,426 | Simon | Sept. 9, 1919 |